(12) United States Patent
Abella et al.

(10) Patent No.: US 8,542,803 B2
(45) Date of Patent: Sep. 24, 2013

(54) SYSTEM AND METHOD FOR INTEGRATING AND MANAGING E-MAIL, VOICEMAIL, AND TELEPHONE CONVERSATIONS USING SPEECH PROCESSING TECHNIQUES

(75) Inventors: Alicia Abella, Morristown, NJ (US); Brian Scott Amento, Morris Plains, NJ (US); Dilek Z. Hakkani-Tur, Denville, NJ (US); Larry Stead, Montclair, NJ (US); Gokhan Tur, Denville, NJ (US); Jay Wilpon, Warren, NJ (US); Jeremy Huntley Wright, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1739 days.

(21) Appl. No.: 11/207,972

(22) Filed: Aug. 19, 2005

(65) Prior Publication Data

US 2007/0041522 A1  Feb. 22, 2007

(51) Int. Cl.
*H04M 1/64* (2006.01)

(52) U.S. Cl.
USPC .................................... 379/88.13; 379/88.22

(58) Field of Classification Search
USPC ....... 379/100.08, 93.24; 709/206; 455/556.1
See application file for complete search history.

(56) References Cited

U.S. PATENT DOCUMENTS

| | | | |
|---|---|---|---|
| 5,163,085 A * | 11/1992 | Sweet et al. | 379/88.19 |
| 5,479,411 A | 12/1995 | Klein | |
| 6,169,911 B1 * | 1/2001 | Wagner et al. | 455/566 |
| 6,219,638 B1 * | 4/2001 | Padmanabhan et al. | 704/235 |
| 6,430,177 B1 * | 8/2002 | Luzeski et al. | 370/356 |
| 6,633,630 B1 * | 10/2003 | Owens et al. | 379/93.24 |
| 6,782,079 B2 | 8/2004 | Skladman et al. | |
| 6,868,143 B1 | 3/2005 | Menon et al. | |
| 6,895,257 B2 * | 5/2005 | Boman et al. | 455/556.1 |
| 7,421,660 B2 * | 9/2008 | Charnock et al. | 715/751 |
| 7,440,900 B2 * | 10/2008 | Chang | 704/275 |
| 2003/0128820 A1 * | 7/2003 | Hirschberg et al. | 379/88.14 |
| 2004/0078446 A1 * | 4/2004 | Daniell et al. | 709/206 |
| 2005/0235034 A1 * | 10/2005 | Chen et al. | 709/206 |
| 2006/0168315 A1 * | 7/2006 | Daniell et al. | 709/237 |
| 2007/0130257 A1 * | 6/2007 | Bedi et al. | 709/204 |

OTHER PUBLICATIONS

J. Gemmell, et al., "The MyLifeBits Lifetime Store", ETP 03, Nov. 7, 2003, pp. 1-4.
S. Whittaker, et al. "SCANMail: a voicemail interface that makes speech browsable, readable and searchable", Minneapolis, Minnesota, USA, Apr. 20-25, 2002, Paper: Speech, Audio Gesture, pp. 275-282.

* cited by examiner

*Primary Examiner* — Joseph T Phan (57) ABSTRACT

A system and a method are provided. A textual transcript of a recorded voice communication is received. Text from a non-voice communication is received. Information about the textual transcript of the recorded voice communication and the text from the non-voice communication is provided such that a user can manage a group of communications, based at least in part on the textual transcript of the recorded voice communication and the text from the non-voice communication.

28 Claims, 5 Drawing Sheets

| 502 | CALLER/SENDER 504 | SIZE 506 | SUBJECT 508 | DATE 510 | SUMMARY 512 |
|---|---|---|---|---|---|
| ☎ | Smith, Jack | 35s | Meeting | 6/2/05 | Status meeting, Friday at 10AM in Conference Room 2 |
| ✉ | Jones, Paul | 35Kb | Conference Call | 5/31/05 | Conference call on June 1 at 2PM EDT |
| ☎☎ | Upton, Mel | 37s | Networking Thing | | Networking thing downtown tomorrow |

Subject: Call From Jack Smith about Meeting
Date: 6/2/05

Hello, this is Jack. I just called to revise you a boat the meeting on fly day at ten a m.
We plan to discuss your project in detail.

Subject: Phone Conversation With Mel Upton about Networking Thing
Date: 6/4/05

Mel: Hi Bill. How our you?

Bill: Fine and yourself.

Mel: Listen, I just called to find out whether you plan to go to the networking thing downtown tomorrow.

Bill: I am very busy now, but I think it is in portent. Count on me to be there.

Mel: Crate! I suggested to some clients that they may want to attend all so.

Bill: That was a good idea. I got to go now. See you tomorrow. Bye.

Mel: Bye.

SYSTEM AND METHOD FOR INTEGRATING AND MANAGING E-MAIL, VOICEMAIL, AND TELEPHONE CONVERSATIONS USING SPEECH PROCESSING TECHNIQUES

BACKGROUND OF THE INVENTION

1. Field of the Invention

The present invention relates to integrating and managing messages and conversations and more specifically to a system and method for using speech processing technology to integrate and manage voice and non-voice messages and conversations.

2. Introduction

Searching for particular text files is much easier than performing similar tasks with audio files. For example, documents or e-mails may be organized and searched or browsed for particular key words, phrases, or subjects. However, humans primarily communicate via speech, not text. For example, many people prefer to communicate by using a telephone than by using e-mail. E-mail constitutes a small proportion of human communication. The much larger proportion, speech, is lost and unavailable for subsequent searching and browsing.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method of managing a plurality of communications is provided. A textual transcript of a recorded voice communication is received. Text from a non-voice communication is received. Information about the textual transcript of the recorded voice communication and the text from the non-voice communication is provided such that a user can manage a group of communications, based at least in part on the textual transcript of the recorded voice communication and the text from the non-voice communication.

In a second aspect of the invention, a machine-readable medium that includes instructions for at least one processor is provided. The machine-readable medium includes instructions for receiving a textual transcript of a recorded voice communication, instructions for receiving text from a non-voice communication, and i instructions for providing information about the textual transcript of the recorded voice communication and the text from the non-voice communication such that a user can manage a plurality of communications, based at least in part on the textual transcript of the recorded voice communication and the text from the non-voice communication.

In a third aspect of the invention, a system is provided. The system includes a first component configured to receive a textual transcription of a recorded voice communication, a second component to receive text from a non-voice communication, and a third component to provide information about the textual transcript of the recorded voice communication and the text from the non-voice communication such that a user can manage a plurality of communications, based at least in part on the textual transcript of the recorded voice communication and a text from a non-voice communication.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary System

Figure 1:
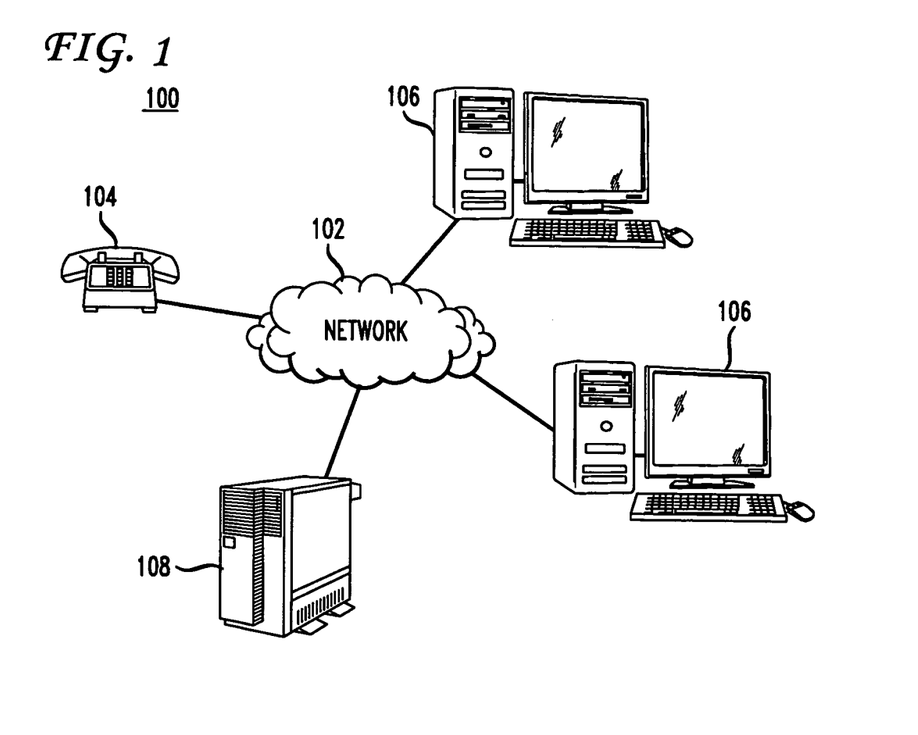
FIG. 1 illustrates an exemplary system in which implementations consistent with the principles of the invention may operate.

FIG. 1 illustrates an exemplary system 100 consistent with the principles of the invention. System 100 may include a network 102, a telephone 104, one or more user workstation stations 106 and a server 108. Telephone 104 and the one or more user worker stations 106 may be connected to network 102 via a physical or wireless connection.

Network 102 may include a network suitable for carrying voice traffic as well as other types of traffic. Network 102 may include, for example, a public switched telephone network (PSTN), a packet switched network, such as, for example, the Internet, or an intranet, an optical network, a wireless network, or any combination of the above networks.

Telephone 104 may be, for example, a conventional telephone, such as, for example, a telephone that is physically connected to a telephone line, or a wireless telephone, for example, a cellular phone or a personal communication system (PCS). Telephone 104 may, alternatively, be a Voice over Internet Protocol (VoIP) phone that may convert voice to digitized packets for transmission through a packet-switched network and that may convert received digitized packets back into voice for a user.

User work stations 106 may include a processing device and may receive voice signals in a form of digitized packets, such as, for example, VoIP packets. In other implementations, user work stations 106 may receive and send conventional telephone signals from and to network 102 over a standard telephone line. In some implementations consistent with the principles of the invention, user work stations 106 may be equipped with a speaker and a microphone (not shown), or alternatively, a headset, such as, for example, a telephone headset (not shown). In other implementations consistent with the principles of the invention, user work stations 106 may be capable of receiving other types of messages, such as, for example, e-mails and/or instant messages (IMs), as well as voice messages.

Server 108 may include a processing device and may execute an application, such as, for example, a voicemail application. Server 108 may receive digital or analog voice signals from network 102 and may digitize the voice signals and store a received voicemail message. After receiving the voicemail message, server 108 may send the received voicemail message to one or more preconfigured e-mail addresses via network 102.

FIG. 1 illustrates an exemplary system. Systems consistent with the principles of the invention may have many telephones 104 or no telephones. A system may have one or more user work stations 106 for sending and receiving messages, such as, for example, e-mails, IMs, or VoIP phone calls Further, the system may have one or more servers 108, which may execute an application, such as, for example, the voicemail application described above.

A caller may place a phone call to a called party who does not answer the call. The call may travel through network 102 to the called party's telephone 104 or user work station 106. After a predefined number of rings have occurred, the call may be redirected to server 108 for recording voicemail messages. Server 108 may, in one implementation, upon completion of recording the voicemail, send an e-mail message including the recorded voicemail message to one or more predefined e-mail addresses. The voicemail message may be included as an attachment to the e-mail message.

In another implementation, when a call is made to a called party using user work station 106, after a predefined number of rings, user work station 106 may answer the call and record a voicemail message. In such an implementation, system 100 may not include server 108.

In yet another implementation consistent with the principles of the invention, sent and/or received e-mails and chat sessions, such as, for example, Instant Message (IM), may be recorded in a database associated with user workstation 106.

Figure 2:
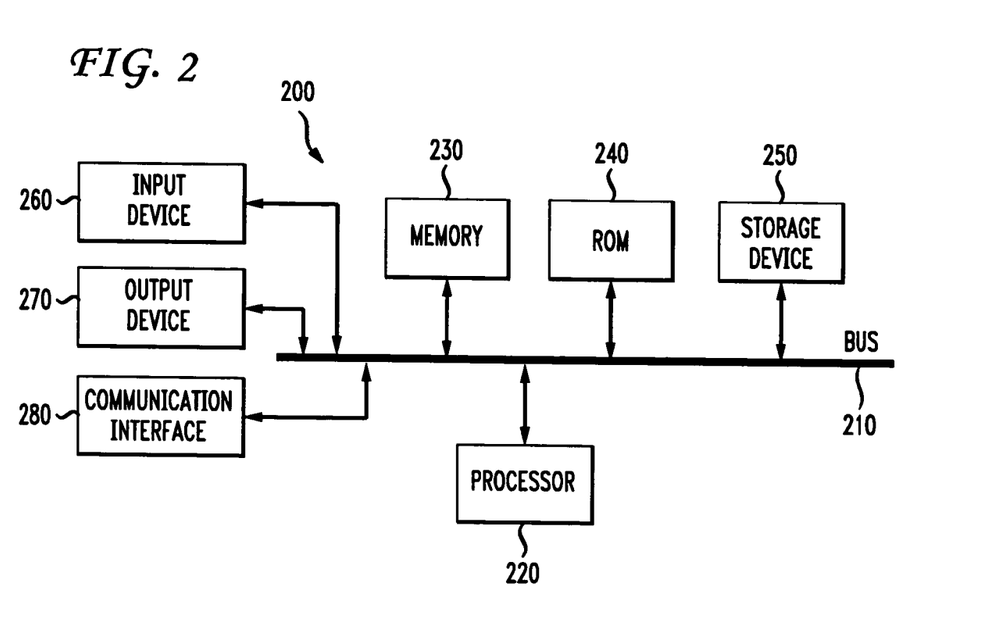
FIG. 2 illustrates an exemplary processing system which may be used to implement an embodiment consistent with the principles of the invention.

FIG. 2 illustrates a block diagram of an exemplary processing device 200 which may implement user workstation 106 or server 108 consistent with the principles of the invention. Processing device 200 may include a bus 210, a processor 220, a memory 230, a read only memory (ROM) 240, a storage device 250, an input device 260, an output device 270, and a communication interface 280. Bus 210 may permit communication among the components of message station 106.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, a microphone, a headset, etc. Output device 270 may include one or more conventional mechanisms that output information to the user, including a display, a printer, one or more speakers, a headset, or a medium, such as a memory, or a magnetic or optical disk and a corresponding disk drive. Communication interface 280 may include any transceiver-like mechanism that enables message station 106 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections.

Processing device 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Figure 3:
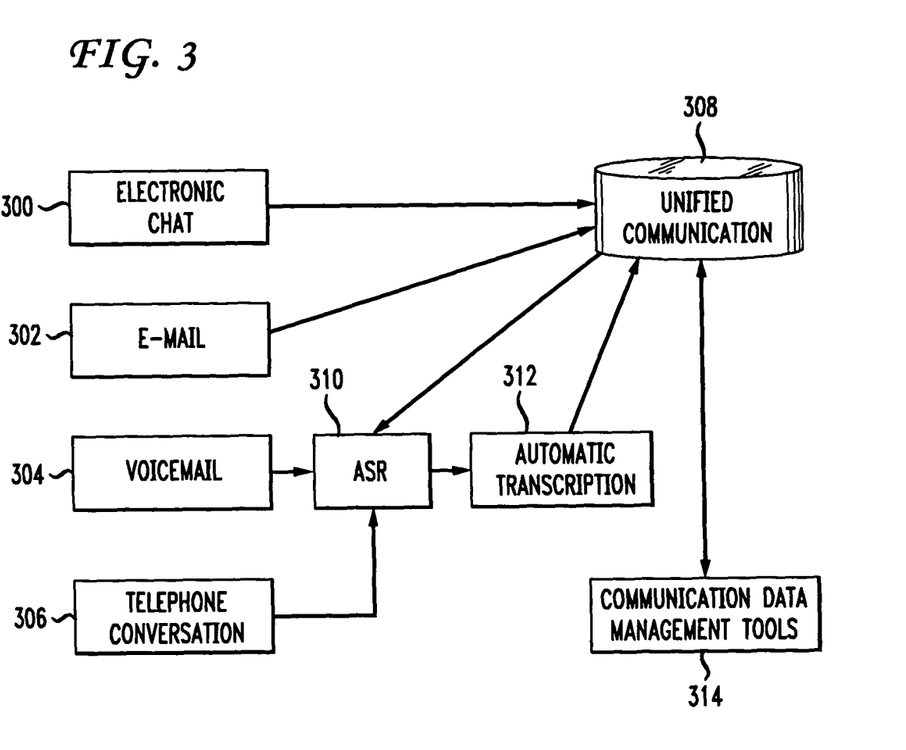
FIG. 3 shows a functional block diagram of an implementation consistent with the principles of the invention.
Figure 4:
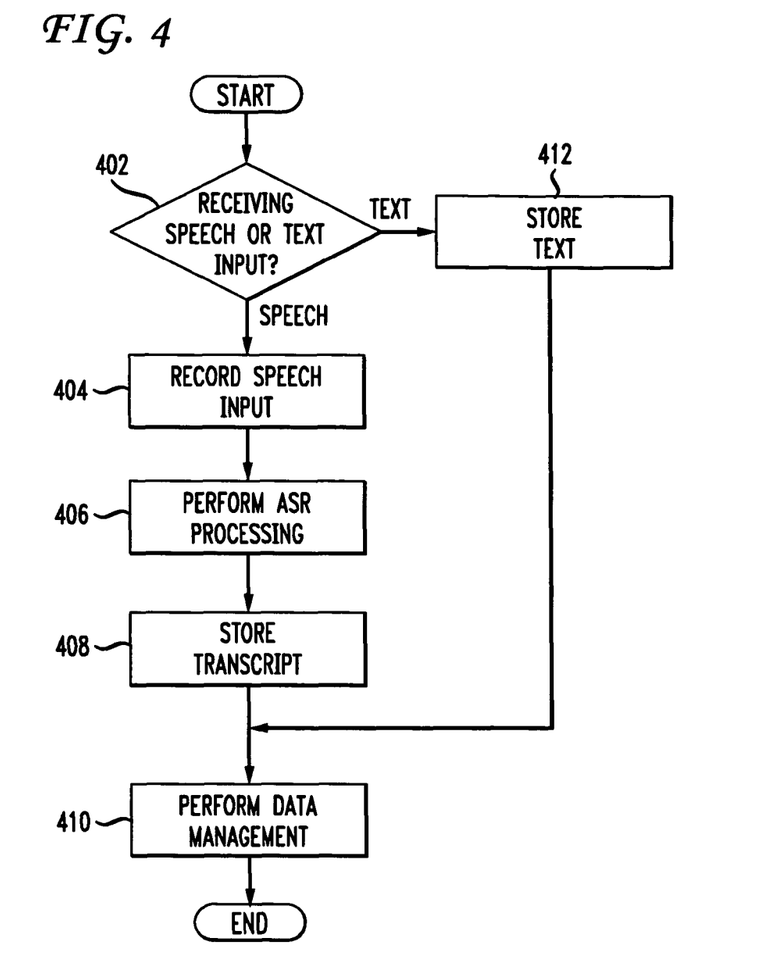
FIG. 4 is a flowchart that illustrates exemplary processing in an implementation consistent with the principles of the invention.

Processing device 220 may be, for example, a personal computer (PC), or any other type of processing device capable of creating and sending messages FIG. 3 illustrates a functional block diagram of exemplary system 100. System 100 may receive electronic chat or IM messages 300 for a chat session, e-mail messages 302, voicemail messages 304, and telephone conversations 306. Text files, such as, for example, electronic chat messages 300 and e-mail messages 302 may be stored in a unified communication database 308. Voicemail messages 304 and telephone conversations 306 may be recorded as speech recordings. Each of the speech recordings may be processed by ASR 310 to produce an automatic transcription 312 of the corresponding speech recording. Automatic transcription 312 may be stored in unified communication database 308 and may include a link to a stored speech recording corresponding to the automatic transcription.

In implementations consistent with the principles of the invention, ASR 310 may process or generate metadata from received speech. For example, telephone originated speech, such as, for example, voicemail 304 or telephone conversation 306 may include callerD or other information. This information may be included with generated automatic transcription 312 for later processing by communication data management tools 314. The functional components illustrated in FIG. 3 may physically reside on one device or on a number of devices that may communicate via network 102. For example, in one implementation, user workstation 106 may store sessions of electronic chat 300 and sent and received e-mails in unified communication database 308. User workstation 106 may also receive and store voicemail messages 304 and telephone conversations 306. The received voicemail messages 304 and telephone conversations 306 may then be processed by ASR 310, in user workstation 106, which may generate automatic transcription 312 for storage into unified communication database 308 associated with user workstation 106.

In another implementation consistent with the principles of the invention, electronic chat 300 and e-mail messages 302 may be stored in unified communication database 308, associated with user workstation 106. Voicemail messages 304 may be stored at server 108, where ASR 310 may reside and may perform speech recognition on voicemail messages 304, which may then be forwarded as, for example, an attachment to an e-mail message, to unified communication database 308 that may reside on user workstation 106. Telephone conversations may be captured by user workstation 106 or server 108 and may be processed via ASR 310 on server 108 or ASR 310 on user workstation 106 to generate automatic transcription 312 for storage in unified communication database 308. A transcription generated by server 108 may be sent to user workstation 106, via, for example, e-mail, for storage in unified communication database 308.

Communication data management tools 314 may reside in the component that includes unified communication database 308 or may reside in a physically separate component that may access unifed communication database 308 remotely, such as, for example, through network 102. In one implementation, a user may request a listing of messages that satisfy a particular set of criteria. The request may be sent to communication data management tools 314. Communication data management tools 314 may access unified communication database 308 to determine which messages satisfy the particular set of criteria and may return results to user workstation 106 for display to the user.

Communication Data Management Tools

Communication data management tools 314 may recognize the stored data in unified communication database 308 as being originally received as speech or text. The basic operations of communication data management tools 314 may include information retrieval and extraction, understanding, and data mining. These capabilities may be provided via a stand-alone user interface or a web-based user interface, or as an extension to regular e-mail clients, such as, for example, Outlook, from Microsoft Corporation of Redmond, Wash.

Information Retrieval

Figure 5:
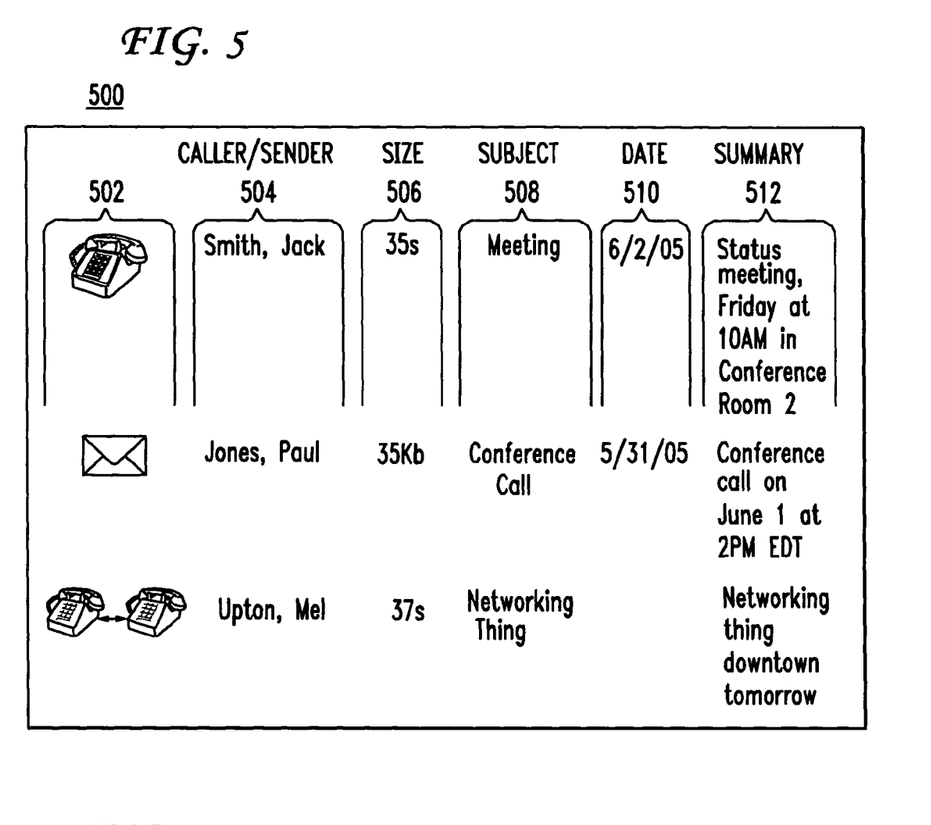
FIGS. 5-7 illustrate exemplary displays that may be employed in implementations consistent with the principles of the invention.

A user interface may permit a user to search and browse data stored in unified communication database 314. For example, a user may browse an input folder for messages resulting in a display, such as, for example, exemplary display 500 being presented, as illustrated by FIG. 5. Display 500 may include an icon 502 or other symbol indicating a type of message. For example, a single telephone icon may indicate a voicemail message, an envelope icon may indicate an e-mail message, and a double telephone icon may indicate a phone conversation. A name of a caller/sender 504 may be displayed. In the case of a voicemail or phone conversation, the caller may be identified by metadata, such as callerID information. A caller may also be identified by words or phrases used within the voice message, as well as other methods. If a caller cannot be identified, but the calling telephone number is known, the telephone number may be displayed. If no information about the caller is known, "Unknown" may be displayed. A size 506 of each of the messages or conversations may be displayed. For voicemail or phone conversations, size may indicate a length of the message in a time unit, such as, for example, seconds, or any other time unit. For e-mail messages, the size may be a size in bytes or any other unit. Display 500 may also include a subject 508 of the message, a date 510 of the message, and a summary of the message. For e-mail messages, subject 508 and date 510 may be obtained from the e-mail message itself. For voice messages, such as voicemail and phone conversations, speech understanding processing may be performed, as discussed below, to derive a subject and/or a summary of the message.

Figure 6:
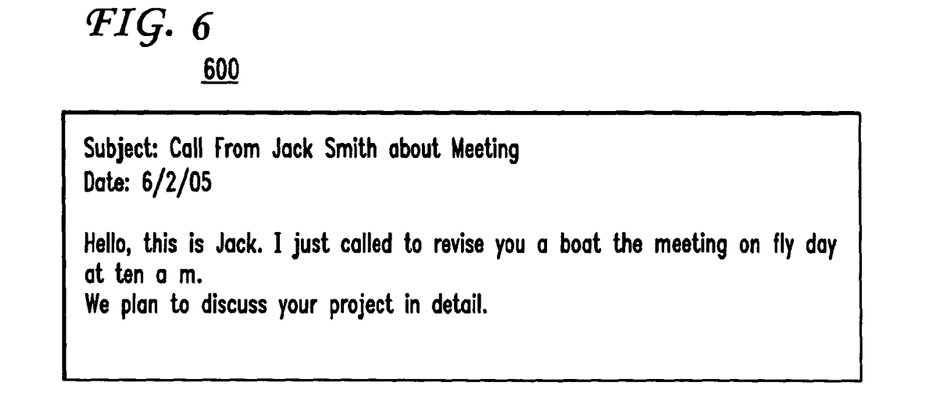

The user may select a message from display 500 to view a complete one of the messages. This may be done by using a pointing device, such as a computer mouse, an electronic pen, a stylus, or other pointing device to select a message. FIG. 6 illustrates an exemplary display 600 of a voicemail message from Jack Smith. The displayed message may include a subject and a date of the message, as well as a transcript of the message. Note that the transcript may have errors due to inaccuracies of the speech recognition process. However, the transcript may provide enough information to determine a gist of the message.

Figure 7:
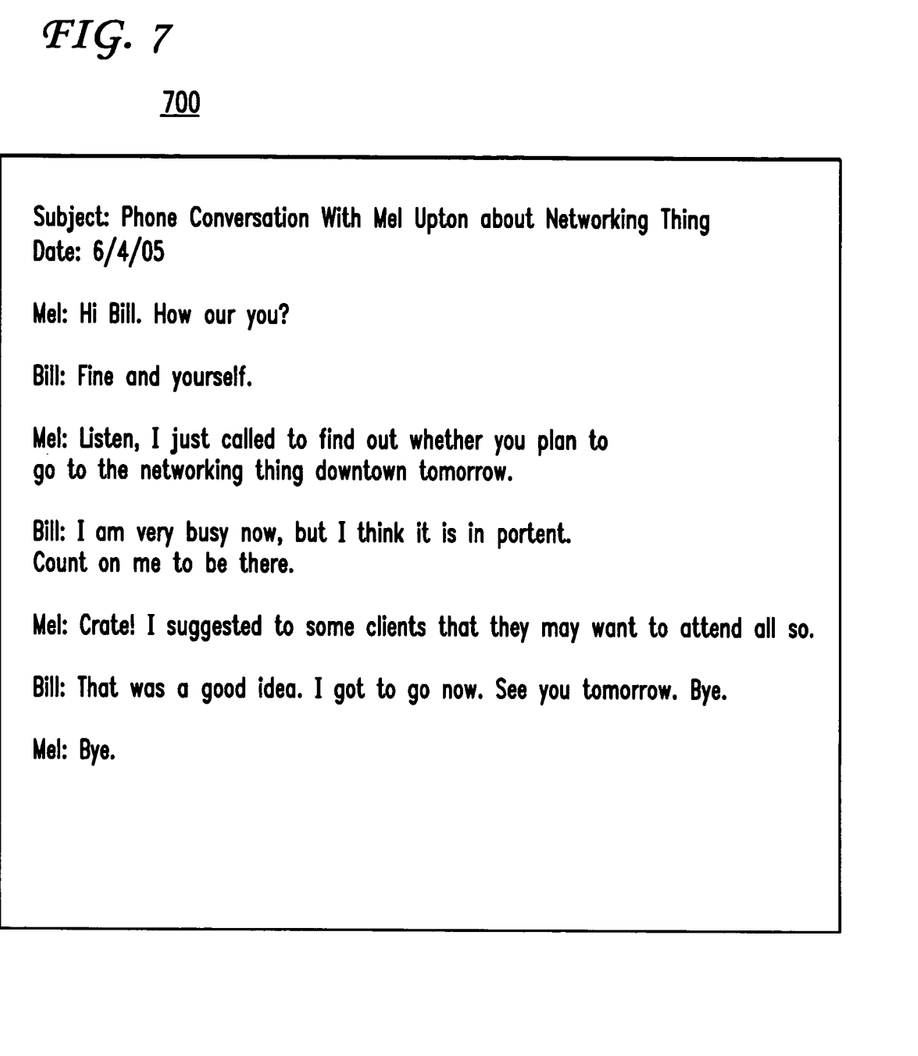

FIG. 7 illustrates an exemplary display 700 of a transcript of a phone conversation that may be displayed by selecting a phone conversation from exemplary display 500 for presentation. Display 700 may include a subject, which may include an identity of a party, and a date of the conversation. Each party speaking may be identified so that one can easily associate portions of the conversation with the corresponding speaking party. The identification of the speaking party may be indicated by displaying a name or other identifier of a speaking party along with one or more words spoken by the party. Other techniques may be used for associating parties with one or more words, such as displaying a transcript of each party's spoken words in a particular color assigned only to that party for a duration of the particular conversation. For example, Mel's words may be displayed in blue, while Bill's words may be displayed in green.

Extraction

Communication data management tools 314 may include an extraction module configured to tag named entities, such as, for example, phone numbers and important information extraction. Named entity tagging and information extraction are well-known techniques to those of ordinary skill in the art. The extraction module may alter the transcription information, such that phone numbers and other important information may be displayed in a color different from the other portions of the transcription.

Understanding

Communication data management tools 314 may include an understanding module to analyze a stored transcript of a voicemail message, telephone conversation, an e-mail message, an electronic chat session, or other communication. The understanding module may perform well-known techniques, such as, for example, looking for key phrases, frequencies of occurrence of words or phrases appearing in the stored transcript, as well as other well-known techniques to determine a topic and/or to generate a summary of the stored message. If a determined topic or summary is incorrect, the user may edit the topic or summary.

Data Mining

Communication data management tools 314 may include a data mining module to perform such well-known speech understanding processing techniques such as, for example, clustering, and classifying, as well as association of messages by subject line (that is, messages with a same or similar subject line may be associated). For example, the clustering may cluster personal messages on one cluster and work-related messages in another cluster.

Automatic Speech Recognition

Initially, an acoustic model (AM) for ASR 310 may be built from a large number of recorded voicemail messages or telephone conversations. Similarly, a language model (LM) for ASR may be built, initially, from numerous e-mail messages, memos, documents, etc. The word accuracy of ASR 310 may be improved such that better quality transcriptions may be generated. Implementations consistent with the principles of the invention may improve the AM and the LM by using models specialized for each user. That is, AMs for each user may be built from recorded voicemails and phone conversations that include a respective user's voice. Similarly, LMs for each user may be built from e-mails, or other documents originating from each respective user. This may be done in an unsupervised manner. Further, accuracy may be improved by the use of cache LMs, or by permitting the user to correct errors, for example, by use of n-best of swipe and/or a type transcription editor and updating the LM based on corrected errors. Further ASR 310 may employ a user detection component when an identity of a party is unknown. For example, ASR 310 may determine an identity of a speaking party via callerD information, if available, by comparing vocabulary used with predefined language models for various speakers, by analyzing the spoken words for hints to the identity of the speaking party, such as spoken phrases as, for example, "Hello, this is your Dad," or by a combination of any of the above-mentioned methods.

In addition, ASR 310 may indicate when predicted accuracy for a word or group of words exceeds a predefined threshold by entering the word or group of words in bold, or via another visual indication, such that predicted accuracy level for at least some words may be known by the appearance of the word or group of words when a transcript of the message is displayed. Similarly, ASR 310 may cause a word or group of words with a predicted accuracy below a second threshold to be recorded in a transcript with another visual indicator, such as, for example, italic font, underline, strikethrough, or any other technique. Thus, a low accuracy visual indication provided when a transcript is displayed may inform a user that the displayed word or group of words indicated by the visual indicator is below a given predicted level of accuracy.

In some implementations, when a word or group of words has a low accuracy visual indicator, the user may select the word or group of words with a pointing device to make a correction. Upon selection of the word or group of words, alternate words or phrases may be listed for the user to select. If none of the alternate words or phrases are correct, the user may type the correct word or phrase.

CONCLUSION

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

The invention claimed is:

1. A method comprising:
   receiving a textual transcript of a recorded voice communication;
   obtaining first information associated with the recorded voice communication from the textual transcript, the first information comprising at least one of a voice originator name and a voice communication subject;
   receiving text from a non-voice communication;
   obtaining second information associated with the non-voice communication, the second information comprising a sender name, a non-voicemail message icon, a voice message date, and a non-voice communication subject;
   presenting, for selection, data about a stored conversation between at least two parties simultaneously with at least one of the first information about the textual transcript of the recorded voice communication and the second information about the text from the non-voice communication, wherein, to yield a selectable presentation;
   receiving a selection based at least in part on the selectable presentation.

2. The method of claim 1, further comprising:
   providing a user interface comprising the selectable presentation for receiving the selection.

3. The method of claim 1, further comprising:
   performing automatic speech recognition on the recorded voice communication to produce the textual transcript.

4. The method of claim 1, wherein the non-voice communication is one of an e-mail message and an electronic chat session.

5. The method of claim 1, further comprising:
automatically sending the textual transcript of the recorded voice communication to at least one destination.

6. The method of claim 5, wherein the at least one destination is determined based, at least in part, on one of an originator of the recorded voice communication and an intended recipient of the recorded voice communication.

7. The method of claim 1, further comprising:
performing at least one of natural language understanding and data mining of the textual transcript of the recorded voice communication.

8. The method of claim 7, further comprising:
performing at least one of natural language understanding and data mining of the text of the non-voice communication.

9. The method of claim 7, wherein performing at least one of natural language understanding and data mining of the textual transcript of the recorded voice communication further comprises:
generating a summary from the textual transcript of the recorded voice communication; and
determining a topic from the textual transcript of the recorded voice communication.

10. The method of claim 2, wherein the user interface permits a user to request and receive a listing providing information of a combination of at least one voice communication and at least one non-voice communication.

11. The method of claim 1, further comprising:
displaying to the user the textual transcript of the recorded voice communication in response to receiving a request for the textual transcript.

12. The method of claim 11, wherein displaying the textual transcript of the recorded voice communication further comprises providing an accuracy indicator for at least one word of the displayed textual transcript to indicate a quality level of the at least one word.

13. The method of claim 11, wherein the textual transcript is generated from one of a voicemail message and a telephone conversation.

14. A non-transitory computer-readable medium including instructions which, when executed by a processor, cause the processor to perform a method comprising:
receiving a textual transcript of a recorded voice communication;
obtaining first information associated with the recorded voice communication from the textual transcript, the first information comprising at least one of a voice originator name and a voice communication subject;
receiving text from a non-voice communication;
obtaining second information associated with the non-voice communication, the second information comprising a sender name, a non-voicemail message icon, a voice message date, and a non-voice communication subject;
presenting to a user, for selection, data about a stored conversation between at least two parties simultaneously with at least one of the first information about the textual transcript of the recorded voice communication and the second information about the text from the non-voice communication, to yield a selectable presentation; and
receiving a selection based at least in part on the selectable presentation.

15. The non-transitory computer-readable medium of claim 14, further storing instructions which, when executed by the processor, cause the processor to perform a method comprising:
providing a user interface comprising the selectable presentation to receive the selection.

16. The non-transitory computer-readable medium of claim 14, further storing instructions which, when executed by the processor, cause the processor to perform a method comprising:
performing automatic speech recognition on the recorded voice communication to produce the textual transcript.

17. The non-transitory computer-readable medium of claim 14, further storing instructions which, when executed by the processor, cause the processor to perform a method comprising:
automatically sending the textual transcript of the recorded voice communication to at least one destination.

18. The non-transitory computer-readable medium of claim 17, further storing instructions which, when executed by the processor, cause the processor to perform a method comprising:
determining the at least one destination based, at least in part, on one of an originator of the recorded voice communication and an intended recipient of the recorded voice communication.

19. The non-transitory computer-readable medium of claim 14, further storing instructions which, when executed by the processor, cause the processor to perform a method comprising:
performing at least one of natural language understanding and data mining of the textual transcript of the recorded voice communication.

20. The non-transitory computer-readable medium of claim 14, further storing instructions which, when executed by the processor, cause the processor to perform a method comprising:
performing at least one of natural language understanding and data mining of the text of the non-voice communication.

21. The non-transitory computer-readable medium of claim 15, wherein providing a user interface permits a user to request and receive a listing providing information of a combination of at least one voice communication and at least one non-voice communication.

22. The non-transitory computer-readable medium of claim 14, further storing instructions which, when executed by the processor, cause the processor to perform a method comprising:
displaying to the user the textual transcript of the recorded voice communication in response to receiving a request for the textual transcript, wherein the textual transcript includes an accuracy indicator for at least one word of the displayed textual transcript to indicate a quality level of the at least one word.

23. A system comprising:
a processor; and
a computer-readable storage medium, which, when executed by the processor, cause the processor to perform a method comprising:
receiving a textual transcription of a recorded voice communication;
obtaining first information associated with the recorded voice communication from the textual transcript, the first information comprising at least one of a voice originator name and a voice communication subject;
receiving text from a non-voice communication;
obtaining second information associated with the non-voice communication, the second information comprising a sender name, a non-voicemail message icon, a voice message date, and a non-voice communication subject;

presenting to a user, for selection, data about a stored conversation between at least two parties simultaneously with at least one of the first information about the textual transcript of the recorded voice communication and the second information about the text from the non-voice communication, to yield a selectable presentation; and receiving a selection of based at least in part on the selectable presentation.

24. The system of claim 23, when the computer-readable storage medium further stores instructions which, when executed by the processor, cause the processor to perform a method comprising:

presenting a user interface component comprising the selectable presentation to receive the selection.

25. The system of claim 23, when the computer-readable storage medium further stores instructions which, when executed by the processor, cause the processor to perform a method comprising:

performing automatic speech recognition on the recorded voice communication to produce the textual transcript.

26. The system of claim 25, when the computer-readable storage medium further stores instructions which, when executed by the processor, cause the processor to perform a method:

automatically sending the textual transcript of the recorded voice communication to at least one destination.

27. The system of claim 26, when the computer-readable storage medium further stores instructions which, when executed by the processor, cause the processor to perform a method:

determining the at least one destination based, at least in part, on one of an originator of the recorded voice communication and an intended recipient of the recorded voice communication.

28. The system of claim 24, when the computer-readable storage medium further stores instructions which, when executed by the processor, cause the processor to perform a method:

permitting a user to request and receive a presentation of information of a combination of at least one voice communication and at least one non-voice communication.

* * * * *